US006773124B2

(12) United States Patent
Marusawa et al.

(10) Patent No.: US 6,773,124 B2
(45) Date of Patent: Aug. 10, 2004

(54) METHOD FOR MANUFACTURING ANTI-GLARE REARVIEW MIRROR FOR VEHICLES

(75) Inventors: Masahiko Marusawa, Shizuoka (JP); Noriyuki Tsutsumi, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 103 days.

(21) Appl. No.: 10/191,317

(22) Filed: Jul. 10, 2002

(65) Prior Publication Data

US 2003/0011908 A1 Jan. 16, 2003

(30) Foreign Application Priority Data

Jul. 12, 2001 (JP) ........................................ 2001-211920

(51) Int. Cl.[7] .............................................. G02B 7/182
(52) U.S. Cl. ...................................................... 359/872
(58) Field of Search ................................ 359/871, 872, 359/602, 603, 604, 605, 606

(56) References Cited

U.S. PATENT DOCUMENTS 4,927,787 A * 5/1990 Patel ........................... 439/189
5,327,288 A * 7/1994 Wellington et al. ......... 359/606

* cited by examiner

Primary Examiner—Euncha Cherry
(74) Attorney, Agent, or Firm—Oblon, Spivak, McClelland, Maier & Neustadt, P.C.

(57) ABSTRACT

A method for manufacturing an anti-glare rearview mirror is disclosed. An anti-glare rearview mirror has a rectangular bracket and a control lever meshed with the bracket in order to change an angle of a mirror. In manufacturing this rear view mirror, the bracket and the control lever are molded in such a manner that a runner integrally connects the bracket and the control lever without interfering movement of the bracket or the control lever of the assembled anti-glare rearview mirror. And a worker separates the bracket and the control lever at the runner with his hands. Next the worker assembles the bracket and the control lever to a mirror housing without removing a remaining part of the runner.

4 Claims, 7 Drawing Sheets

METHOD FOR MANUFACTURING ANTI-GLARE REARVIEW MIRROR FOR VEHICLES

FIELD OF THE INVENTION

The present invention relates to a method for manufacturing an anti-glare rear view mirror for vehicles, and more particularly, to a method for enabling an efficient assembling of an anti-glare rearview mirror for vehicles.

BACKGROUND OF THE INVENTION

An automobile is generally equipped with an anti-glare rearview mirror in the driver's compartment so that good visibility of the driver is ensured by adjusting its reflectivity even if the driver is dazzled by the light of the following car. Most of the anti-glare rearview mirrors have a prismatic mirror whose front face and rear face are different in reflectivity, and the rearview mirror is movable between normal position and anti-glare position by turning the prismatic mirror at a certain angle while providing the driver with the same visual field.

The following mechanism for turning a mirror of anti-glare rearview mirror is known as a conventional rearview mirror for vehicles. An anti-glare rearview mirror consists of a mirror, a mirror housing, a rectangular bracket, a control lever, and a fixing stay. The bracket has a turning axle that is projecting outwardly from both ends of one side, and on the opposite side of its turning axle, the bracket has an engaging portion. This bracket is pivotally mounted to the mirror housing to which the prismatic mirror is fixed. The control lever, for controlling movement of the mirror between normal and anti-glare position, consists of a stick-shaped body and a flat handle provided along and at the mid-point of the body. Also, an engaging portion is formed on one side of the stick-shaped body. This control lever is also pivotally mounted to the mirror housing with its engaging portion meshed with the engaging portion of the bracket. This rearview mirror is fixed to the vehicle body by a fixing stay that connects the bracket with the vehicle body through an aperture of the mirror housing.

In this mechanism, turning the control lever with an operation of the handle allows the bracket to turn slightly to change a relative angle between the bracket and the mirror housing. As described above, since the bracket is fixed to the vehicle body by the fixing stay, the operation of turning the control lever does not change the position of the bracket but changes the angle of the mirror instead, so that the reflection on the prismatic mirror switches between the front and rear face of the mirror.

The bracket and the control lever of this anti-glare mirror are molded together in one die for reducing the cost of the die as well as saving the time for molding. Therefore, as illustrated in FIG. 6 or FIG. 7, the bracket and the control lever are molded integrally and connected by runners.

Figure 6A:
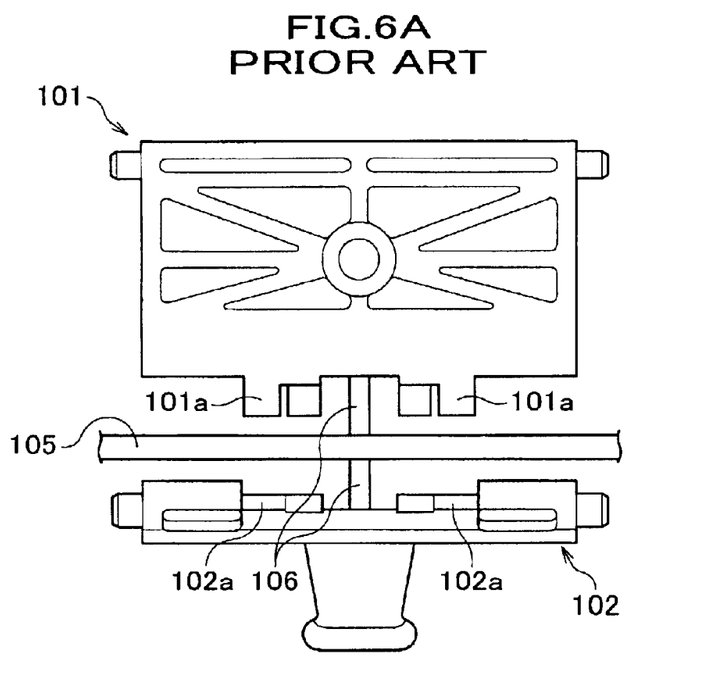
FIG. 6A illustrates a plan view of the bracket and the control lever molded integrally according to a conventional anti-glare rearview mirror for vehicles.
Figure 6B:
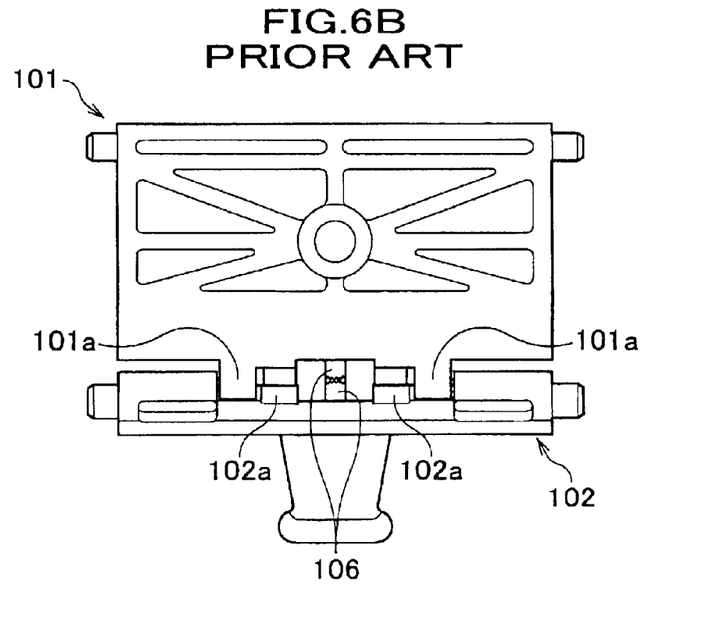
FIG. 6B illustrates a plan view of the bracket and the control lever engaged with each other according to the conventional anti-glare rearview mirror of FIG. 6A.

In FIG. 6A, a bracket 101 and a control lever 102 respectively have an engaging portion 101a, 102a which are to be engaged each other. The bracket 101 and the control lever 102 are molded together in such a manner that a sub runner 106 vertically branched from a main runner 105 connects the engaging portions 101a, 102a with said engaging portions 101a, 102a faced each other. When the bracket 101 and the control lever 102 are assembled, the assembler cuts off the sub runner 106, brings the bracket 101 and the lever 102 close to each other while retaining the facing posture, engages the engaging portions 101a, 102a, and places the assembly into a mirror housing (FIG. 6B).

Figure 7A:
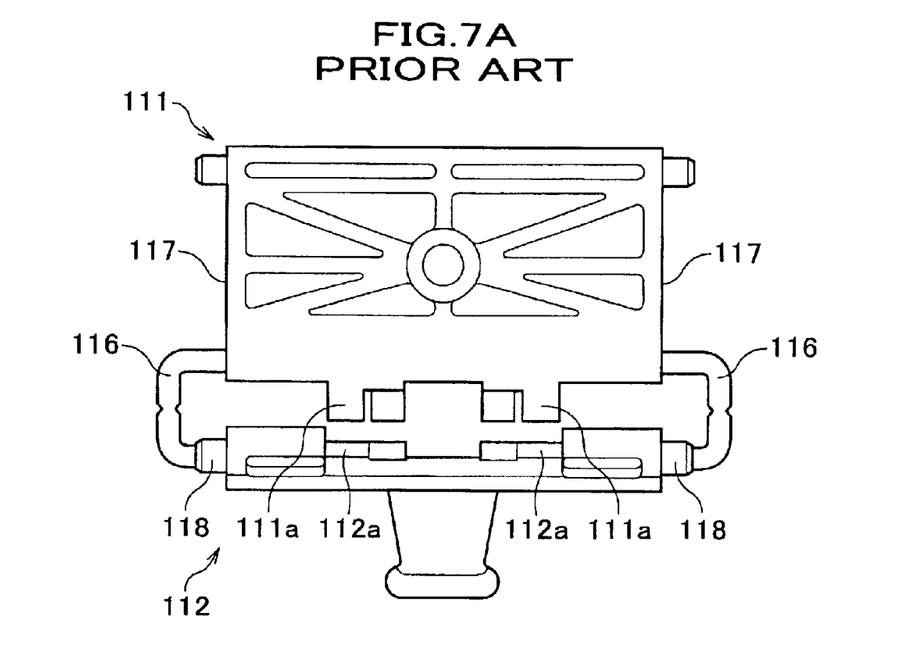
FIG. 7A illustrates a plan view of a bracket and a control lever molded integrally according to another example of a conventional anti-glare rearview mirror for a vehicle.
Figure 7B:
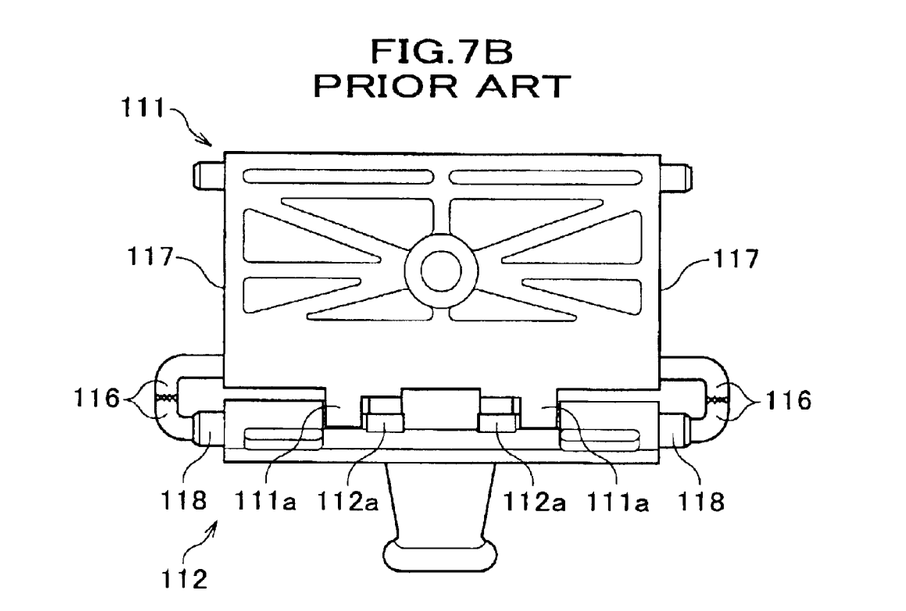
FIG. 7B illustrates a plan view of the bracket and the control lever engaged with each other according to the conventional anti-glare rearview mirror of FIG. 7A.

In FIG. 7A, a bracket 111 and a control lever 112 respectively have an engaging portion 111a, 112a which are to be engaged each other. The bracket 111 and the control lever 112 are molded together in such a manner that two U-shaped runners 116 connect both ends of a turning pivot 118 of the control lever 112 and the side parts 117 of the bracket 111, with said engaging portions 111a, 112a faced each other.

However, the aforementioned conventional anti-glare mirror shown in FIG. 6A has a drawback if the bracket 101 and the control lever 102 are separated at the runner 106 and assembled together into the anti-glare mirror without removing remaining parts or burrs of the runner 106. The drawback is that the remaining parts interfere each other upon operating the control lever 102, as illustrated in FIG. 6B, resulting defective operation of the control lever 102 or rapping sounds during the operation. Therefore, it is necessary to remove the remaining parts of the runner 106 from the bracket 101 and the control lever 102 respectively with use of nippers and the like.

As shown in FIG. 7B, the aforementioned conventional anti-glare mirror has a similar drawback in that if the bracket 111 and the control lever 112 are separated at the runners 116 and assembled together without removing remaining parts or burrs of the runners 116, as illustrated in FIG. 7B, the remaining parts interfere each other.

Meanwhile, it is time-consuming if a worker removes all remaining parts in the assembly line during assembling operation. For this reason, the bracket and the control lever have to be separated in advance with the remaining parts of the runner removed. Therefore, an additional operation and extra stock space are required.

Moreover, it is troublesome for the worker to pick up the bracket and the control lever from different cases and assemble them.

SUMMARY OF THE INVENTION

In order to rectify these problems, the object of this invention is to provide a method for manufacturing an anti-glare rearview mirror without requiring removal of runners and so facilitates efficient assembly.

In light of this object, the first aspect of the present invention is to provide a method for manufacturing an anti-glare rearview mirror. The rearview mirror as a workpiece of the manufacture includes a mirror, a mirror housing for fixing the mirror, a bracket pivotally mounted to the mirror housing, and a control lever pivotally mounted to the mirror housing and engaged with the bracket. The relative angle between the bracket and the mirror housing is varied by a turning operation of the control lever relative to the mirror housing. In manufacturing this rearview mirror, the bracket and the control lever are molded integrally in such a manner that a runner connects the bracket and that the control lever does not interfere the movement of the bracket or the control lever if these parts are assembled to an anti-glare rearview mirror. Further, the bracket and the control lever is separated at the runner, and these parts are assembled to the mirror housing without removing a remaining part of the runner.

According to this method, the runner is formed so as not to interfere the movement of the bracket or the control lever if the bracket and the control lever are assembled into the anti-glare rearview mirror, so that a worker can separate the control lever from the bracket and assemble the bracket and the control lever into the mirror housing without cutting off the remaining part of the runner. Therefore, efficient assembly of the anti-glare rearview mirror for vehicles is achieved by leaving out the step of removing the runner. Moreover, the separated bracket and the separated control lever are available for assembling without additional process. This allows leaving out space for keeping these parts in each case and the brackets and the controls lever may be stocked in a single case and kept as an integrated body.

Meanwhile, it is preferable that the runner for connecting the bracket with the control lever is connected to inconspicuous part, for example, the surface of the engaging portion or the turning pivot to ensure its function, or the surface of the control lever to keep its external view.

The second aspect of the present invention provides a method for manufacturing an anti-glare rearview mirror. The rearview mirror as a workpiece of the manufacture includes a mirror, a mirror housing for fixing the mirror, a bracket pivotally mounted to the mirror housing, and a control lever pivotally mounted to the mirror housing and engaged with the bracket. So the relative angle between the bracket and the mirror housing is varied by a turning operation of the control lever relative to the mirror housing. In manufacturing this rearview mirror, the bracket and the control lever are integrally connected by a runner in such a manner that engaging portions of the bracket and that of the control lever are faced each other and that a recess portion is formed in at least one of the bracket or the control lever so as not to interfere movement of the bracket or the control lever of the assembled anti-glare rearview mirror. Further, the bracket and the control lever are separated at the runner, and these parts are assembled to the mirror housing without removing a remaining part of the runner.

According to this method, the bracket and the control lever are molded integrally connected by a runner with the engaging portion of them faced each other, and at least one of the bracket or the control lever has a recess portion that prevent an interference with a remaining part of the runner. An assembler, therefore, can separate and mesh the bracket and the lever without additional process. The worker can also assemble them to the mirror housing without turning the aspect of the lever because the engaging portion of the bracket and that of the lever have already faced each other.

Moreover, the third aspect of the present invention provides a method for manufacturing an anti-glare rearview mirror. The rear view mirror as a workpiece of the manufacture includes a mirror, a mirror housing for fixing the mirror, a bracket pivotally mounted to the mirror housing, and a control lever pivotally mounted to the mirror housing and engaged with the bracket. So the relative angle between the bracket and the mirror housing is varied by a turning operation of the control lever relative to the mirror housing. In manufacturing this rearview mirror, the bracket and the control lever are integrally connected by a runner in such a manner that engaging portions of the bracket and that of the control lever are faced each other. Further, the bracket and the control lever are separated at the runner and these parts are engaged at the engaging portions without removing a remaining part of the runner with the control lever shifted along a direction of its turning axis with respect to the bracket. Finally the bracket and the control lever are assembled to the mirror housing.

Shifting the control lever relative to the bracket in the direction of its turning axis in this manner prevents an interference of these parts with the runner, so that a worker can leave out removing process of the runners.

Furthermore, the fourth aspect of the present invention provides a method for manufacturing an anti-glare rearview mirror as described above, wherein the runner has a weak section for facilitating a handwork separation of said control lever from said bracket.

This weak section allows a worker to assemble the bracket and the control lever into a mirror housing through an operation of holding the integrally-molded bracket and lever in each hand and of separating them with a twisting action and the like, while the worker needs no turning operation of these parts. In this way, the assembly process of anti-glare rearview mirror for vehicles becomes more efficient.

DESCRIPTION OF THE PREFERRED EMBODIMENT

Figure 1:
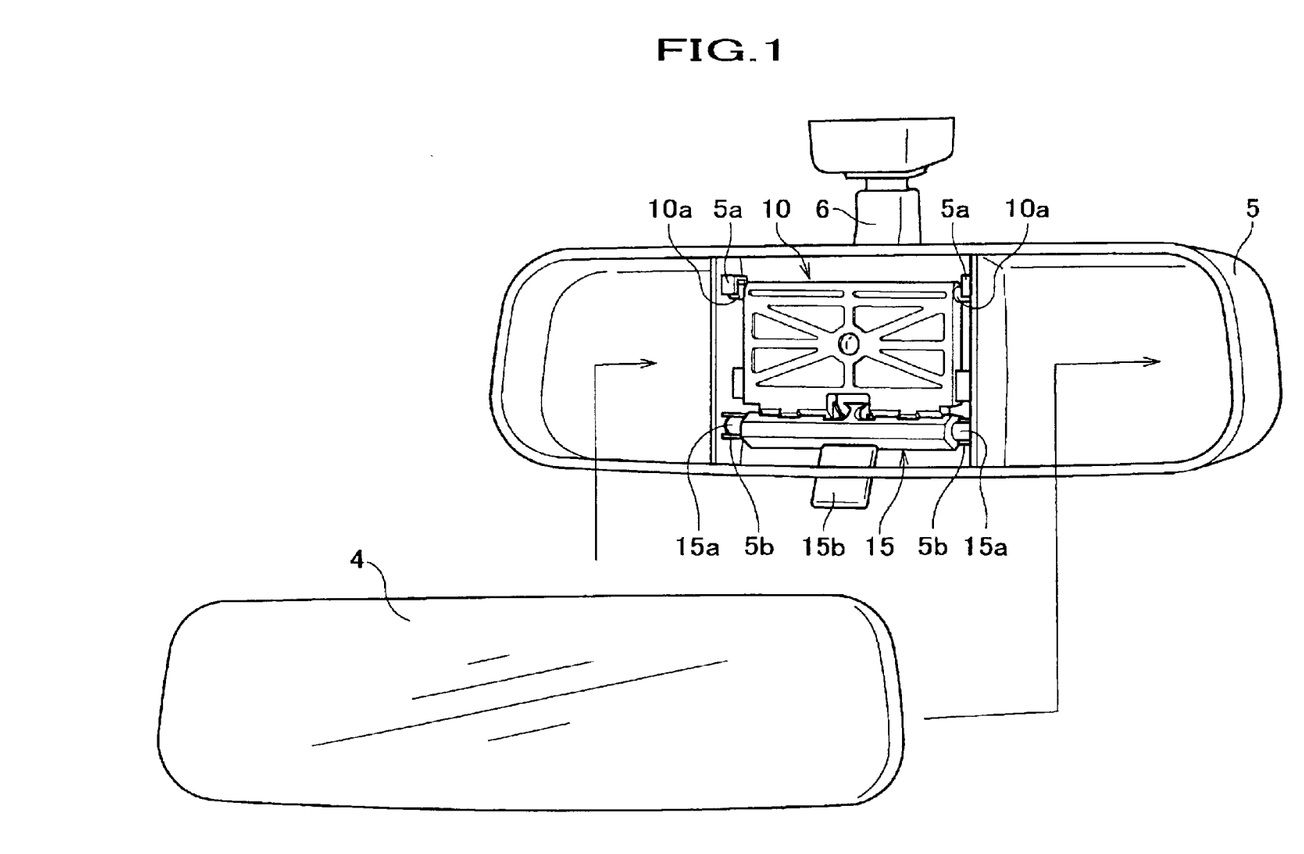
FIG. 1 illustrates a perspective view of an anti-glare rearview mirror after a bracket and a control lever has assembled to a mirror housing.
Figure 2A:
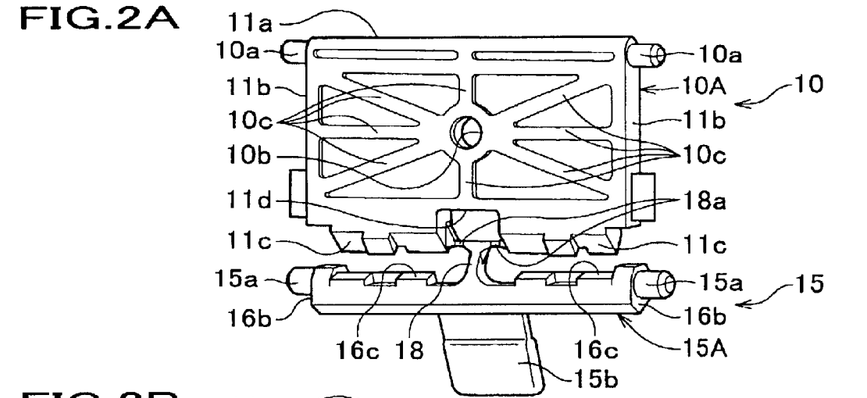
FIG. 2A illustrates a perspective view of a bracket and a control lever molded integrally according to the first embodiment of the invention.
Figure 2B:
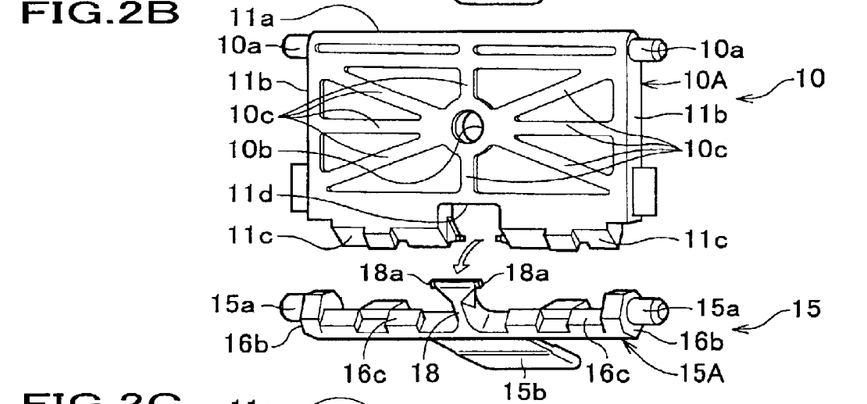
FIG. 2B illustrates a perspective view of the bracket and the control lever separated from each other according to the first embodiment of the invention.
Figure 2C:
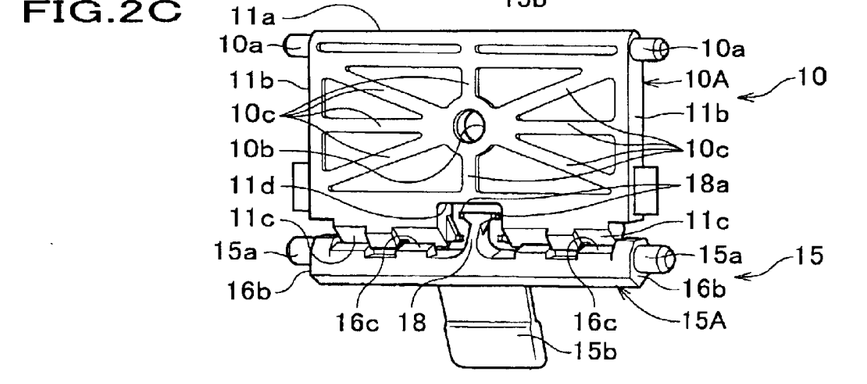
FIG. 2C illustrates a perspective view of the bracket and the control lever assembled to a mirror housing according to the first embodiment of the invention.

With reference to the drawings, embodiments of the present invention are thereinafter described in detail. In these drawings, FIG. 1 illustrates a perspective view of an anti-glare rearview mirror after a bracket and a control lever has assembled to a mirror housing; FIG. 2A illustrates a perspective view of the bracket and the control lever molded integrally according to the first embodiment of the invention; FIG. 2B illustrates a perspective view of the bracket and the control lever separated from each other according to the first embodiment of the invention; and FIG. 2C illustrates a perspective view of the bracket and the control lever assembled to the mirror housing according to the first embodiment of the invention.

As illustrated in FIG. 1, an anti-glare rearview mirror for vehicles with respect to the first embodiment of a method for manufacturing the mirror comprises a mirror 4, a mirror housing 5, a rectangular platy bracket 10, and a control lever 15 for controlling the movement of the rearview mirror between a normal position and an anti-glare position. The bracket 10 is pivotally mounted to the mirror housing 5 to turn around a bracket-turning pivot 10*a*. This bracket 10 is fixed to a vehicle body by a fixing stay 6. The control lever 15 is rotatably mounted on the mirror housing 5 thereby enabling the control lever 15 to turn around a lever-turning pivot 15*a*. A side of the bracket 10 is meshed with a side of the control lever 15, so a turning operation of the control lever 15 turns the bracket 10 and varies the relative angle between the mirror housing 5 and the bracket 10. Because the mirror 4 is a prismatic mirror having different reflectivity between its front and rear face, the reflectivity of the rearview mirror changes in accordance with the change in the above relative angle.

As illustrated in FIG. 2A, the bracket 10 and the control lever 15 are molded together in one die by one-shot injection and are connected by a runner 18 for reducing the cost of the die as well as saving time for molding.

The bracket 10 comprises a rectangular platy bracket body 10A and the bracket-turning pivot 10*a* projecting outwardly from both ends of upper side 11*a* in FIG. 2A. The bracket-turning pivot 10*a* is pivotally mounted to a support hole 5*a* of the mirror housing 5 as shown in FIG. 1, so the bracket 10 is rotatable relative to the mirror housing 5 as a result.

The bracket 10 is formed an engaging portion 11*c* that meshes with the control lever 15 by uneven faces and that is arranged on a lower side away from and opposite to the upper side 11*a*. The engaging portion 11*c* is divided right and left in two by forming a rectangular recess 11*d* at the mid-point of the lower side.

The bracket body 10A also has a spherical recess 10*b* at the center thereof, and a spherical part, which fits to the spherical recess 10*b*, is formed at the end of the fixing stay 6 while the fixing stay 6 is fixed to the vehicle body. Fitting the spherical part to the spherical recess 10*b* allows the mirror housing 5 to turn over freely while the mirror housing 5 is fit to the vehicle body.

The bracket body 10A also comprises ribs 10*c* . . . all around the edge of the bracket's face and between its four corners and the spherical recess 10*b* in order to reinforce itself.

The control lever 15 comprises the lever-turning pivots 15*a* projecting from the both ends of and along a lever body 15A having polygonal section and stick shape. The lever-turning pivot 15*a* is pivotally mounted to the support hole 5*b* of the mirror housing 5, so the control lever 15 is rotatable relative to the mirror housing 5 as a result.

The control lever 15 also comprises an engaging portion 16*c* on the upper side of the lever body 15A in FIG. 2A. The engaging portion 16*c* meshes with the engaging portion 11*c* of the bracket 10 in order to transmit the motion of the control lever 15 to the bracket 10, and thereby enables the bracket 10 to turn around the bracket-turning pivot 10*a*. The engaging portion 16*c* is divided right and left in two by forming a projected T-shaped runner 18 at the mid-point of the engaging portion 16*c*. The lever body 15A also comprises a rectangular platy handle 15*b* at the mid-point of the opposite side and along the lever body 15A.

These bracket 10 and control lever 15 are molded integrally connected by the runner 18 with the engaging portion 11*c* and the engaging portion 16*c* faced each other.

The runner 18 extends from the mid-point of the engaging portion 16*c* toward the recess 11*d*, branches right and left inside the recess 11*d*, and connects to the bracket 10 to form T-shape. The branched parts are partly narrow to make a weak section 18*a* that is weaker than general section of the branch. This weak section 18*a* enables an easy handwork separation of the control lever 15 from the bracket 10 by twisting the control lever 15 against the bracket 10. Besides, the depth and width of the recess 11*d* is respectively deeper and wider than the length and width of the runner 18 toward the recess 11*d*, thus there is no interference between the runner 18 and the recess 11*d* when they are assembled into a rearview mirror.

A rearview mirror is manufactured by using the bracket 10 and the control lever 15 as mentioned above through following processes. As shown in FIG. 2A, the bracket 10 and the control lever 15 are molded integrally connected with the runner 18. And an assembler holds the bracket 10 and the control lever 15 in each hand and twists them to tear at the weak section 18*a*, then, as shown in FIG. 2B, the bracket 10 and the control lever 15 are separated as a result.

Next the assembler keeps holding the bracket 10 and the control lever 15 and brings them close to each other. Then, as shown in FIG. 2C, the remained runner 18 is shifted front and back and the engaging portion 11*c* is meshed with the engaging portion 16*c*. Holding these parts meshed, the assembler fits the bracket-turning pivot 10*a* in the support hole 5*a* of the mirror housing 5, and he pushes the lever-turning pivot 15*a* into the support hole 5*b* to fit in. Then he fits the fixing stay 6 in the spherical recess 10*b* of the bracket 10 and, further, he fits the mirror 4 to the front edge of the mirror housing to finish assembling the rearview mirror.

In this way, according to a method for manufacturing an anti-glare rear view mirror of the present embodiment, an assembler can fit the bracket 10 and the control lever 15 in the mirror housing 5 only by twisting and tearing the runner 18 without removing the remaining runner 18 or without changing his holding positions. Moreover, because the bracket 10 has a recess 11*d* to be away from movable area of the runner 18 at their assembled arrangement, the runner 18 does not interfere with the bracket 10 or recess 11*d* without removing the remaining runner 18. As a result, there is no defect of producing so-called rapping sound. According to the present embodiment, therefore, an assembler can abbreviate a process of cutting off a runner, and can assemble an anti-glare rearview mirror more efficiently. Further, not only manpower required for cutting off the runners 18 but also space for storing brackets 10 and control levers 15 separately become unnecessary.

Figure 3A:
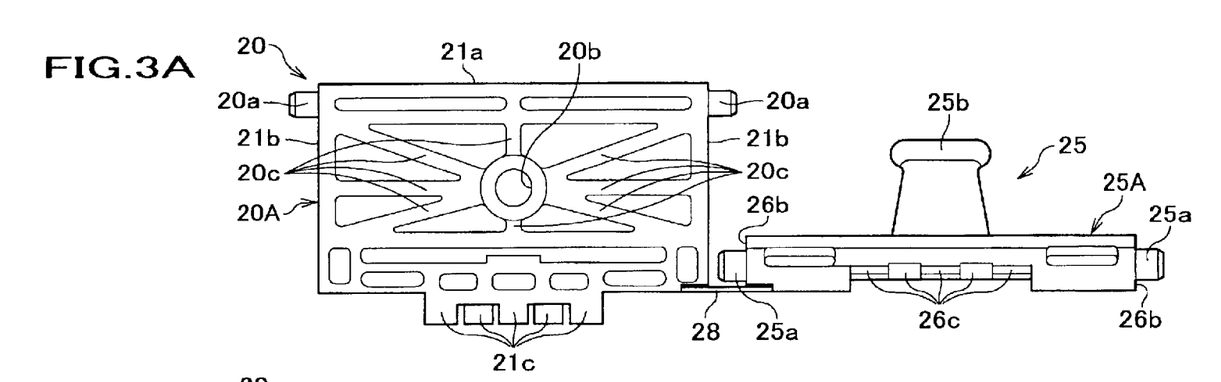
FIG. 3A illustrates a plan view of the bracket and the control lever molded integrally according to the second embodiment of the invention.
Figure 3B:
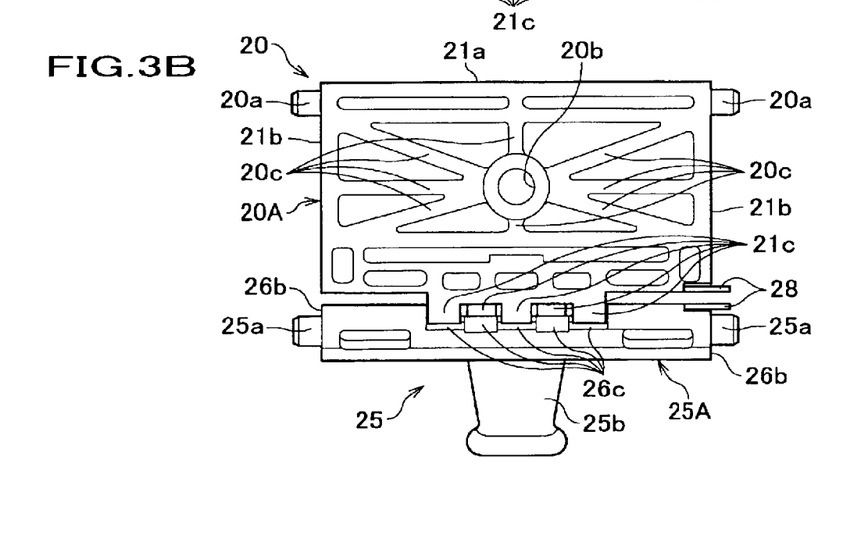
FIG. 3B illustrates a plan view of the bracket and the control lever engaged with each other according to the second embodiment of the invention.

The second embodiment of the present invention, as another example of bracket and control lever, will now be described. FIG. 3A illustrates a plan view of a bracket and a control lever molded integrally according to a second embodiment of the invention, and FIG. 3B illustrates a plan view of the bracket and the control lever engaged with each other according to the second embodiment of the invention. In the present embodiment, parts or elements similar to those previously described regarding the first embodiment will be denoted by the same reference numbers and the description thereof will be omitted.

As shown in FIG. 3A, a bracket 20 and a control lever 25 are molded together in one die by one-shot injection and are connected by a runner 28 for reducing the cost of the die as well as saving time for molding.

The bracket 20 comprises a rectangular platy bracket body 20A and the bracket-turning pivot 20a projecting outwardly from both ends of upper side 21a in FIG. 3A. The bracket-turning pivot 20a is pivotally mounted to a support hole 5a of the mirror housing 5 as shown in FIG. 1, so the bracket 20 is rotatable relative to the mirror housing 5 as a result.

The lower side of the bracket 20 opposite to and away from the upper side 21a is provided with an uneven-faced engaging portion 21c extending along half the length of the lower side at its mid-point, and meshable with the control lever 25.

The bracket body 20A also has a spherical recess 20b at the center, and a spherical part, which fits to the spherical recess 20b, is formed at the end of the fixing stay 6 while the fixing stay 6 (not shown) is fixed to the vehicle body. Fitting the spherical part to the spherical recess 20b allows the mirror housing 5 to turn over freely while the mirror housing is fit to the vehicle body.

The bracket body 20A also comprises ribs 20c . . . all around the edge of the bracket's face and between its four corners and the spherical recess 20b in order to reinforce itself.

One end of the lower side of the bracket 20 is notched rectangularly and a wiry runner 28 extends sidewardly from the side face of the notch.

The control lever 25 comprises the lever-turning pivots 25a projecting from the both end faces 26b and along a lever body 25A having polygonal section and stick shape. The lever-turning pivot 25a is pivotally mounted to the support hole 5b of the mirror housing 5, so the control lever 25 is rotatable relative to the mirror housing 5 as a result. The control lever 25 is placed on a lateral side of the bracket 20 from which the runner 28 is extended and the end faces 26b is placed on the extension line of the runner 28 to be connected with the runner 28.

The control lever 25 also comprises an engaging portion 26c on the upper side of the lever body 25A in FIG. 2A. The lower side of the lever body 25A, as shown in FIG. 3A, is provided with an engaging portion 21c extending along half the length of the lower side at its mid-point, and meshable with the engaging portion 26c. The engaging portion 26c meshes with the engaging portion 21c of the bracket 20 in order to transmit the motion of the control lever 25 to the bracket 20, and thereby enables the bracket 20 to turn around the bracket-turning pivot 20a. The lever body 25A also comprises a rectangular platy handle 25b at the mid-point of the opposite side and along the lever body 25A.

The runner 28 does not interfere a motion of the bracket 20 or of the control lever 25 when the engaging portion 21c and engaging portion 26c are meshed each other, because the runners 28, as shown in FIG. 3B, respectively project sidewardly.

A rearview mirror is manufactured by using the bracket 20 and the control lever 25 as mentioned above through following processes. As shown in FIG. 3A, the bracket 20 and the control lever 25 are molded integrally connected with the runner 28. And an assembler holds the bracket 20 and the control lever 25 in each hand and draws, bends, or twists them to tear at the runner 28, and to separate them to the bracket 20 and the control lever 25.

Next the assembler keeps holding the bracket 20, turn over them, and brings them close to each other, then, as shown in FIG. 3C, meshes the engaging portion 21c with the engaging portion 26c. Holding these parts meshed, the assembler fits the bracket-turning pivot 20a in the support hole 5a of the mirror housing 5, and he pushes the lever-turning pivot 25a into the support hole 5b to fit in. Then he fits the fixing stay 6 in the spherical recess 20b of the bracket 20 and, further, he fits the mirror 4 to the front edge of the mirror housing to finish assemble of the rearview mirror.

In this way, according to a method for manufacturing an anti-glare rear view mirror of the present embodiment, an assembler can fit the bracket 20 and the control lever 25 in the mirror housing 5 only by twisting and tearing the runner 28 without removing the remaining runner 28 or without changing his holding positions. Moreover, because the remaining runners 28 merely protrude sidewardly from the assembled bracket 20 or control lever 25, the runner 28 does not interferer a motion of bracket 20 or control lever 25 without removing the remaining runner 28. As a result, there is no defect of producing so-called rapping sound. According to the present embodiment, therefore, an assembler can abbreviate a process of cutting off a runner, and can assemble an anti-glare rearview mirror more efficiently. Further, not only manpower required for cutting off the runners 28 but also space for storing brackets 20 and control levers 25 separately become unnecessary.

Figure 4A:
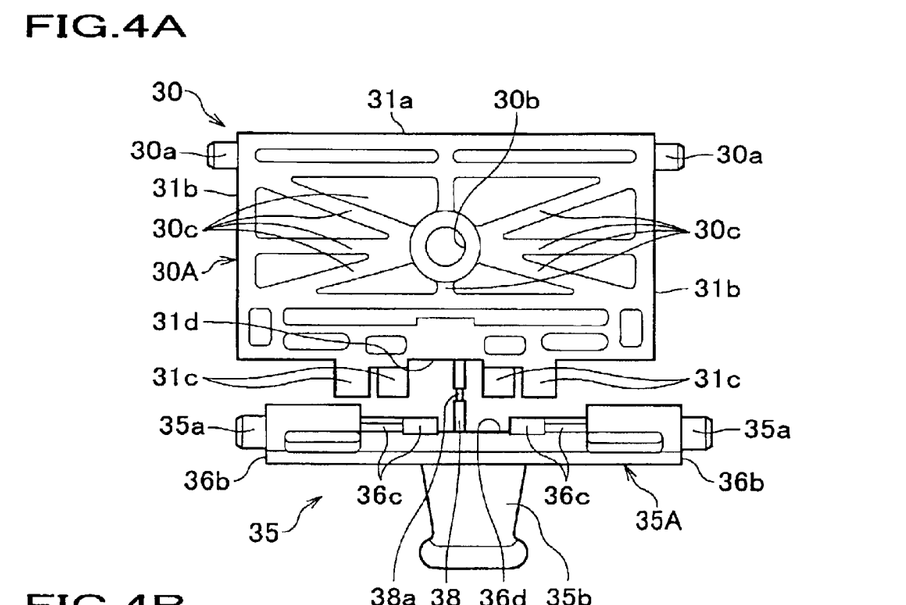
FIG. 4A illustrates a plan view of a bracket and a control lever molded integrally according to the third embodiment of the invention.
Figure 4B:
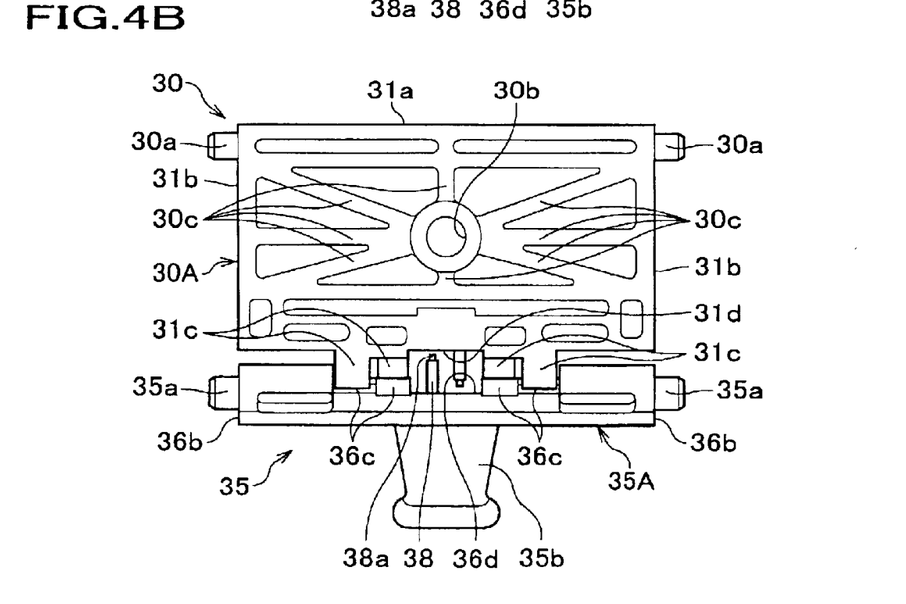
FIG. 4B illustrates a plan view of the bracket and the control lever engaged with each other according to the third embodiment of the present invention.

The third embodiment of the present invention, as another example of bracket and control lever, will now be described. FIG. 4A illustrates a plan view of a bracket and a control lever molded integrally according to a third embodiment of the invention; FIG. 4B illustrates a plan view of the bracket and the control lever engaged with each other according to the third embodiment of the present invention. In the present embodiment, parts or elements similar to those previously described regarding the first embodiment will be denoted by the same reference numbers and the description thereof will be omitted.

As shown in FIG. 4A, a bracket 30 and a control lever 35 are molded together in one die by one-shot injection and are connected by a runner 38 for reducing the cost of the die as well as saving time for molding.

The bracket 30 comprises a rectangular platy bracket body 30A and the bracket-turning pivot 30a projecting outwardly from both ends of upper side 31a in FIG. 4A. The bracket-turning pivot 30a is pivotally mounted to a support hole 5a of the mirror housing 5 as shown in FIG. 1, so the bracket 30 is rotatable relative to the mirror housing 5 as a result.

The lower side of the bracket 30 opposite to and away from the upper side 31a is provided with an uneven-faced engaging portion 21c extending half the length of the lower side at its mid-point, and meshable with the control lever 25. The engaging portion 31c is divided right and left in two at its mid-point by forming a rectangular recess 31b.

The bracket body 30A also has a spherical recess 30b at the center thereof, and a spherical part, which fits to the spherical recess 30b, is formed at the end of the fixing stay 6 while the fixing stay 6 (not shown) is fixed to the vehicle body. Fitting the spherical part to the spherical recess 30b allows the mirror housing 5 to turn over freely while the mirror housing is fit to the vehicle body.

The bracket body 30A also comprises ribs 30c . . . all around the edge of the bracket's face and between its four corners and the spherical recess 30b in order to reinforce itself.

The control lever 35 comprises the lever-turning pivots 35a projecting from the both end faces 36b and along a lever body 35A having polygonal section and stick shape. The lever-turning pivot 35a is pivotally mounted to the support hole 5b of the mirror housing 5, so the control lever 35 is rotatable relative to the mirror housing 5 as a result. The lower side of the lever body 35A is provided with an engaging portion 36c that will mesh with an engaging portion 31c along the half middle of the lower side. The engaging portion 36c is divided right and left in two by forming a rectangular recess 36d at its mid-point. The engaging portion 36c meshes with the engaging portion 31c of the bracket 30 in order to transmit the motion of the control lever 35 to the bracket 30, and thereby enables the bracket 30 to turn around the bracket-turning pivot 30a. The lever body 35A also comprises a trapeziform platy handle 35b at the mid-point of the opposite side and along the lever body 35A.

The bracket 30 and the control lever 35 are connected with each other by a runner 38 with their engaging portions faced each other and shifted relative to their meshing position. The runner 38 has thin cylindrical shape and comprises a weak section 38a having narrower section at its center than other section of the runner 38. Further, the above recess 31d and the recess 36d notched deeply enough not to interfere the movement of remained runner 38 after they are separated and assembled.

A rearview mirror is manufactured by using the bracket 30 and the control lever 35 as mentioned above through following processes. As shown in FIG. 4A, the bracket 30 and the control lever 35 are molded integrally connected with the runner 38. And an assembler holds the bracket 30 and the control lever 35 in each hand and draw, bend, or twists them to tear at the weak section 38a, then, the bracket 30 and the control lever 35 are separated as a result.

Next the assembler keeps holding the bracket 30 and the control lever 35 and brings them close to each other. Then, as shown in FIG. 4B, the remained runner 18 is shifted front and back and the engaging portion 31c is meshed with the engaging portion 36c. Holding these parts meshed, the assembler fits the bracket-turning pivot 30a in the support hole 5a of the mirror housing 5, and he pushes the lever-turning pivot 35a into the support hole 5b to fit in. Then he fits the fixing stay 6 in the spherical recess 30b of the bracket 10 and, further, he fits the mirror 4 to the front of the mirror housing to finish assemble of the rearview mirror.

In this way, according to a method for manufacturing an anti-glare rear view mirror of the present embodiment, an assembler can fit the bracket 30 and the control lever 35 in the mirror housing 5 only by tearing the runner 38 by twisting or the like them with his hands without removing the remaining runner 38 or without changing his holding positions. Moreover, because the recess 31d and the recess 36d is notched deep enough not to interfere the motion of the remained runners 38 after they are separated and assembled, there is no defect of producing so-called rapping sound. According to the present embodiment, therefore, an assembler can abbreviate a process of cutting off a runner, and can assemble an anti-glare rearview mirror more efficiently. Further, not only manpower required for cutting off the runners 38 but also space for storing brackets 30 and control levers 35 separately become unnecessary.

Figure 5A:
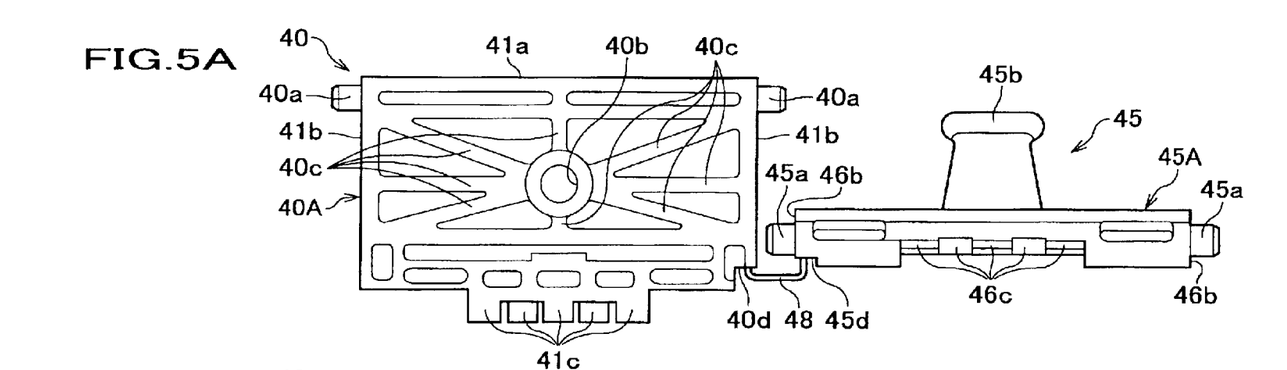
FIG. 5A illustrates a plan view of a bracket and a control lever molded integrally according to the fourth embodiment of the invention.
Figure 5B:
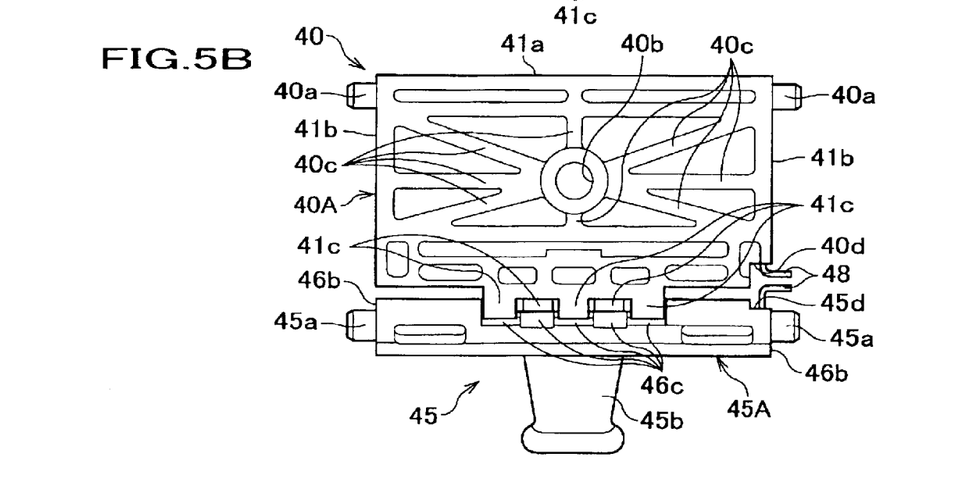
FIG. 5B illustrates a plan view of the bracket and the control lever engaged with each other according to the fourth embodiment of the invention.

The fourth embodiment of the present invention, as another example of bracket and control lever, will now be described. FIG. 5A illustrates a plan view of a bracket and a control lever molded integrally according to a fourth embodiment of the invention; FIG. 5B illustrates a plan view of the bracket and the control lever engaged with each other according to the fourth embodiment of the invention. In the present embodiment, parts or elements similar to those previously described regarding the first embodiment will be denoted by the same reference numbers and the description thereof will be omitted.

As shown in FIG. 5A, a bracket 40 and a control lever 45 are molded together in one die by one-shot injection and are connected by a runner 48 for reducing the cost of the die as well as saving time for molding.

The bracket 40 comprises a rectangular platy bracket body 40A and the bracket-turning pivot 40a projecting outwardly from both ends of upper side 41a in FIG. 5A. The bracket-turning pivot 40a is pivotally mounted to a support hole 5a of the mirror housing 5 as shown in FIG. 1, so the bracket 40 is rotatable relative to the mirror housing 5 as a result.

The lower side of the bracket 40 opposite to and away from the upper side 41a is provided with an uneven-faced engaging portion 41c extending along half the length of the lower side at its mid-point, and meshable with the control lever 45.

The bracket body 40A also has a spherical recess 40b at the center, and a spherical part, which fits to the spherical recess 40b, is formed at the end of the fixing stay 6 while the fixing stay 6 (not shown) is fixed to the vehicle body. Fitting the spherical part to the spherical recess 40b allows the mirror housing 5 to turn over freely while the mirror housing is fit to the vehicle body.

The bracket body 40A also comprises ribs 40c . . . all around the edge of the bracket's face and between its four corners and the spherical recess 40b in order to reinforce itself.

One end of the lower side of the bracket 20 is notched rectangularly to form a notch 40d and a thin wiry runner 48 extends downwardly from the undersurface of the notch.

The control lever 45 comprises the lever-turning pivots 45a projecting from the both end faces 46b and along a lever body 45A having polygonal section and stick shape. The lever-turning pivot 45a is pivotally mounted to the support hole 5b of the mirror housing 5, so the control lever 45 is rotatable relative to the mirror housing 5 as a result.

The lower side of the lever body 45A, as shown in FIG. 5A, is provided with an engaging portion 41c extending half the length of the lower side at its mid-point, and meshable with the engaging portion 46c. The engaging portion 46c meshes with the engaging portion 41c of the bracket 40 in order to transmit the motion of the control lever 45 to the bracket 40, and thereby enables the bracket 40 to turn around the bracket-turning pivot 40a. The lever body 45A also comprises a trapezoidal platy handle 25b with a wide upper end at the mid-point of the opposite side and along the lever body 45A.

One end face 46b of the control lever 45 is notched rectangularly to form a notch 45d. A wiry runner 28 extends downwardly from the undersurface of the notch 45d.

The bracket 40 and the control lever 45 are placed side by side with their notches 40d, 45d close and they are connected by a runner 48 extended respectively from the notches 40d, 45d. Formed like crooked U-shape, the runner 48 connects the undersurfaces of the above notches 40d, 45. Also, as shown in FIG. 5B, the runner 48 is formed in such a manner that the runner 48 does not interfere motion of the bracket 40 or the control lever when the engaging portion 41c and the engaging portion 46c are meshed with each other.

A rearview mirror is manufactured by using the bracket 40 and the control lever 45 as mentioned above through following processes. As shown in FIG. 5A, the bracket 40 and the control lever 45 are molded integrally connected with the runner 48. And an assembler holds the bracket 40 and the control lever 45 in each hand and draws, bends, or twists them to tear at the runner 28, and to separate them to the bracket 40 and the control lever 45.

Next the assembler keeps holding the bracket 40, turn over them, and brings them close to each other, then, as shown in FIG. 5C, meshes the engaging portion 41c with the engaging portion 46c. Holding these parts meshed, the assembler fits the bracket-turning pivot 40a in the support hole 5a of the mirror housing 5, and he pushes the lever-turning pivot 45a into the support hole 5b to fit in. Then he fits the fixing stay 6 in the spherical recess 40b of the bracket 40 and, further, he fits the mirror 4 to the front of the mirror housing to finish assemble of the rearview mirror.

In this way, according to a method for manufacturing an anti-glare rear view mirror of the present embodiment, an assembler can fit the bracket 40 and the control lever 45 in the mirror housing 5 only by twisting and tearing the runner 48 without removing the remaining runner 48 or without changing his holding positions. Moreover, because the remaining runners 48 merely protrude sidewardly from the assembled bracket 40 or control lever 45, the runner 48 does not interferer a motion of bracket 40 or control lever 45 without removing the remaining runner 48. As a result, there is no defect of producing so-called rapping sound. According to the present embodiment, therefore, an assembler can abbreviate a process of cutting off a runner, and can assemble an anti-glare rearview mirror more efficiently. Further, not only manpower required for cutting off the runners 48 but also space for storing brackets 40 and control levers 45 separately become unnecessary.

Of course, the present invention is not restricted to the embodiment described. Thus, a runner for connecting a bracket and a control lever may be formed in such a manner that the runner does not interfere a motion of assembled bracket or control lever by a turning operation of the control lever. The runner may be provided at various places, for example, at a corner of a bracket, at an end of a turning pivot, or at a side of an engaging portion formed protruding shape.

What is claimed is:

1. A method for manufacturing an anti-glare rearview mirror, the rearview mirror including a mirror, a mirror housing for fixing the mirror, a bracket pivotally mounted to the mirror housing, and a control lever pivotally mounted to the mirror housing and engaged with the bracket so as to vary a relative angle between the bracket and the mirror housing by a turning operation of the control lever relative to the mirror housing, the method comprising the steps of:

molding the bracket and the control lever as one piece such that a runner integrally connects the bracket and the control lever;

separating the bracket and the control lever at the runner; and assembling the bracket and the control lever to the mirror housing without removing a remaining part of the runner, wherein the remaining of the runner does not interfere with movement of the bracket or the control lever of the assembled anti-glare rearview mirror.

2. A method for manufacturing an anti-glare rearview mirror, the rearview mirror including a mirror, a mirror housing for fixing the mirror, a bracket pivotally mounted to the mirror housing, and a control lever pivotally mounted to the mirror housing and engaged with the bracket so as to vary a relative angle between the bracket and the mirror housing by a turning operation of the control lever relative to the mirror housing, the method comprising the steps of:

molding the bracket and the control lever in such a manner that a runner integrally connects the bracket and the control lever, with engaging portions of the bracket and the control lever faced each other, and that a recess portion is formed in at least one of the bracket or the control lever so as not to interfere movement of the bracket or the control lever of the assembled anti-glare rearview mirror;

separating the bracket and the control lever at the runner; and assembling the bracket and the control lever to the mirror housing without removing a remaining part of the runner.

3. A method for manufacturing an anti-glare rearview mirror, the rearview mirror including a mirror, a mirror housing for fixing the mirror, a bracket pivotally mounted to the mirror housing, and a control lever pivotally mounted to the mirror housing and engaged with the bracket so as to vary a relative angle between the bracket and the mirror housing by a turning operation of the control lever relative to the mirror housing, the method comprising the steps of:

molding the bracket and the control lever as one piece such that a runner integrally connects the bracket and the control lever, with engaging portions of the bracket and the control lever faced each other;

separating the bracket and the control lever at the runner;

engaging the control lever and the bracket without removing a remaining part of the runner and with the control lever shifted along a direction of its turning axis with respect to the bracket; and assembling the bracket and the control lever to the mirror housing, where in the remaining part of the runner does not interfere with movement of the bracket or the control lever of the assembled anti-glare rearview mirror.

4. A method for manufacturing an anti-glare rearview mirror as claimed in any one of claims 1 to 3, wherein said runner has a weak section for facilitating a handwork separation of said control lever from said bracket.

* * * * *